United States Patent
Araki

(10) Patent No.: US 9,930,201 B2
(45) Date of Patent: Mar. 27, 2018

(54) IMAGE FORMING APPARATUS

(71) Applicant: KYOCERA Document Solutions Inc., Osaka (JP)

(72) Inventor: Takashi Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/460,692

(22) Filed: Mar. 16, 2017

(65) Prior Publication Data
US 2017/0279996 A1 Sep. 28, 2017

(30) Foreign Application Priority Data
Mar. 25, 2016 (JP) ................. 2016-061306

(51) Int. Cl.
*G06F 3/12* (2006.01)
*H04N 1/00* (2006.01)
*G06F 3/06* (2006.01)

(52) U.S. Cl.
CPC ....... *H04N 1/00925* (2013.01); *G06F 3/0604* (2013.01); *G06F 3/0629* (2013.01); *G06F 3/0673* (2013.01); *H04N 1/00339* (2013.01); *H04N 1/00472* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2012/0127139 A1* | 5/2012 | Hayami | ................... | G06F 8/61 345/204 |
| 2013/0097381 A1* | 4/2013 | Komatsu | ................ | G06F 12/08 711/118 |
| 2016/0342443 A1* | 11/2016 | McDermott | .......... | G06F 9/5016 |

FOREIGN PATENT DOCUMENTS

JP 2011-048590 A 3/2011

* cited by examiner

*Primary Examiner* — Moustapha Diaby
(74) *Attorney, Agent, or Firm* — Studebaker & Brackett PC

(57) ABSTRACT

A MFP includes a storage device, a RAM device, and a CPU. The MFP is capable of executing a standard program and an application that is not a standard program. The MFP receives specification of: an application deployment area upper limit as an upper limit of a size of a deployment area of the RAM device in which the application is deployed; and a Java heap upper limit as an upper limit of a size of a processing area of the RAM device that the application uses for a process (S107). The MFP controls starting of the application according to the application deployment area upper limit and the Java heap upper limit, which were specified in S107.

11 Claims, 17 Drawing Sheets

Application "NNNNN" has failed to start. It may be possible to start application "NNNNN" if running application is ended.

FIG. 9

217b Restriction degree determination table

| Value obtained by subtracting upper limits from capacity of RAM | Details of restriction of standard functions |
|---|---|
| not less than "yyy" | Number of sheets simultaneously accumulated by RIP process: 10 |
| not less than "xxx" and less than "yyy" | Number of sheets simultaneously accumulated by RIP process: 5 |
| ⋮ | ⋮ |

IMAGE FORMING APPARATUS

INCORPORATION BY REFERENCE

The present application claims priority under 35 U.S.C. § 119 to Japanese Patent Application No. 2016-061306, filed Mar. 25, 2016. The contents of this application are incorporated herein by reference in their entirety.

BACKGROUND

The present disclosure relates to an image forming apparatus capable of executing a standard program and an application that is not a standard program.

As an image forming apparatus capable of executing a standard program and an application that is not a standard program, there has been known a typical image forming apparatus that changes an upper limit of a size of a heap area of a random access memory (RAM) device that the application uses for a process.

SUMMARY

An image forming apparatus of the present disclosure includes a central processing unit (CPU), a random access memory (RAM) device, and a storage device. The storage device stores a standard program, a Java (registered trademark) application, and an application start control program that controls starting of the Java application. The CPU executes the application start control program to function as an application starting section and a specification receiving section. The application starting section controls starting of the Java application according to a first upper limit of a size of a deployment area of the RAM device in which the Java application is deployed and a second upper limit of a size of a processing area of the RAM device that the Java application uses for a process. The specification receiving section receives setting of the first upper limit of the size of the deployment area and the second upper limit of the size of the processing area.

BRIEF DESCRIPTION OF THE DRAWINGS

FIG. 9 is a diagram illustrating an example of a message displayed by the operation illustrated in FIG. 8.

DETAILED DESCRIPTION

The following describes embodiments of the present disclosure with reference to the drawings.

First Embodiment

First, a configuration of a multifunction peripheral (MFP) as an image forming apparatus according to a first embodiment of the present disclosure will be described.

Figure 1:
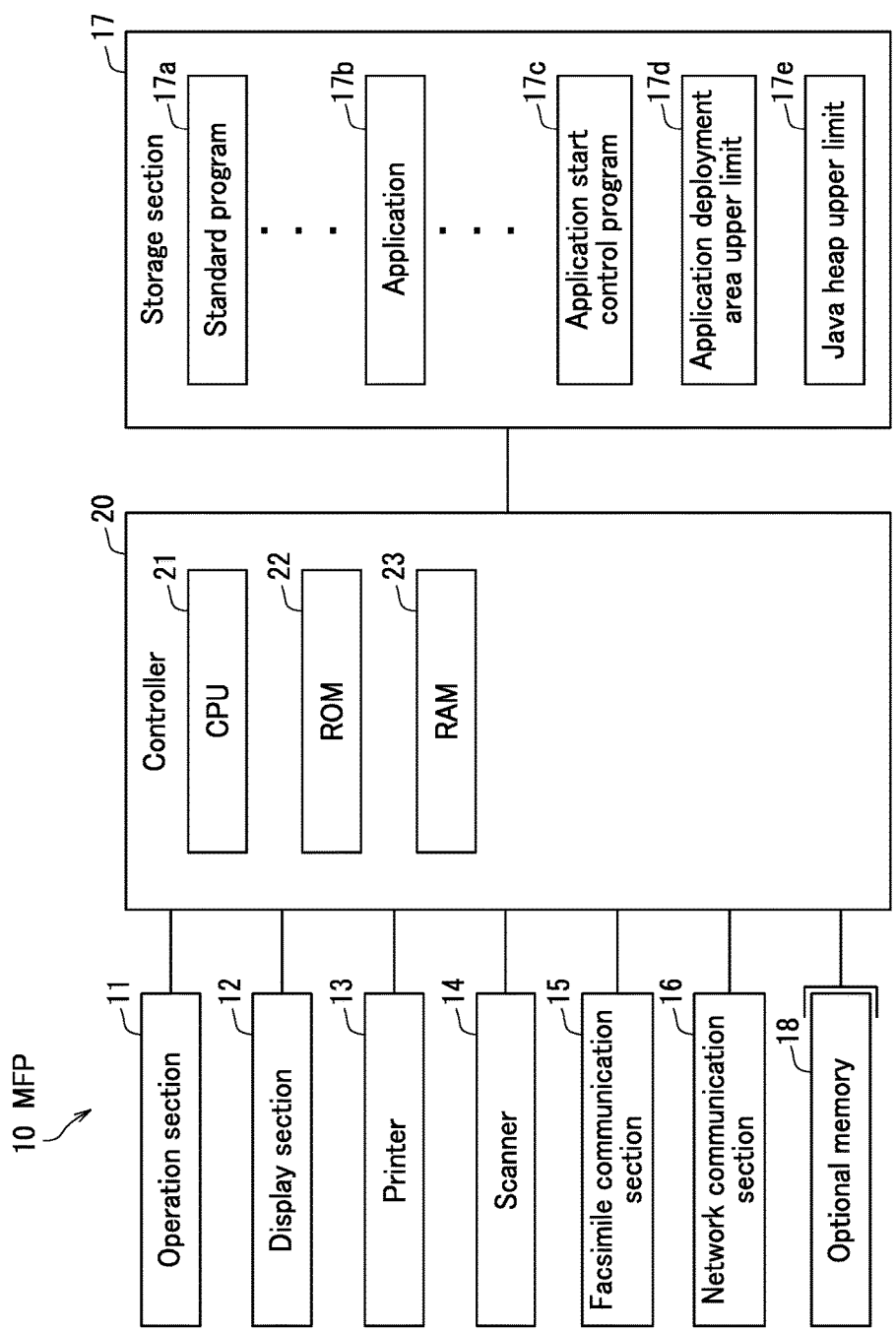
FIG. 1 is a block diagram of a multifunction peripheral (MFP) according to a first embodiment of the present disclosure.

FIG. 1 is a block diagram of a MFP 10 according to the present embodiment.

As illustrated in FIG. 1, the MFP 10 includes an operation section 11, a display section 12, a printer 13, a scanner 14, a facsimile communication section 15, a network communication section 16, a storage section 17, and a controller 20. The operation section 11 is a button or the like through which various operations are input. The display section 12 is a display device such as a liquid crystal display (LCD) that displays various information. The printer 13 is a printing device that performs printing on a recording medium such as paper. The scanner 14 is a reading device that reads an image from an original document. The facsimile communication section 15 is a facsimile device that performs facsimile communication with an external facsimile device (not shown) via a communication line such as a public telephone line. The network communication section 16 is a network communication device that performs communication with an external device via a network such as the Internet. The storage section 17 is a nonvolatile storage device such as a semiconductor memory and a hard disk drive (HDD) that stores various information. The controller 20 controls the entirety of the MFP 10.

The MFP 10 can further include an optional memory 18 as an optional random access memory (RAM) device.

The storage section 17 stores a number of standard programs 17a. The standard programs 17a include for example a printing program, a scanning program, a copying program, a facsimile transmission program, and a transmission program. The printing program causes the printer 13 to perform printing on a recording medium based on print data input from an external source such as print data received through the network communication section 16. The scanning program causes the scanner 14 to read an image from an original document. The copying program causes the printer 13 to print an image read by the scanner 14 from an original document on a recording medium. The facsimile transmission program causes facsimile transmission of an image such as an image read by the scanner 14 from an original document to an external facsimile device through the facsimile communication section 15. The transmission program causes transmission of an image such as an image read by the scanner 14 from an original document to an external device through the network communication section 16. The standard programs 17a may be installed in the MFP 10 during manufacture of the MFP 10. Alternatively, the standard programs 17a may be additionally installed in the MFP 10 from an external storage medium such as an SD card or a universal serial bus (USB) memory or additionally installed in the MFP 10 via a network.

The storage section 17 stores a number of applications 17b that are not the standard programs 17a. The applications 17b may be installed in the MFP 10 during manufacture of the MFP 10. Alternatively, the applications 17b may be additionally installed in the MFP 10 from an external storage medium such as an SD card or a USB memory or additionally installed in the MFP 10 via a network. The applications 17b are Java (registered trademark) applications. Therefore, though not shown, the storage section 17 stores a Java platform that the controller 20 executes in order to execute the applications 17b. Note that the applications 17b include a resident application that is automatically started after the Java platform has been started and a non-resident application other than the resident application. The non-resident application is started for example in response to an instruction input through the operation section 11.

The storage section 17 stores an application start control program 17c for controlling starting of the applications 17b. The application start control program 17c may be installed in the MFP 10 during manufacture of the MFP 10. Alternatively, the application start control program 17c may be additionally installed in the MFP 10 from an external storage medium such as an SD card or a USB memory or additionally installed in the MFP 10 via a network.

The controller 20 includes for example a central processing unit (CPU) 21, a read only memory (ROM) device 22, and a RAM device 23. The ROM device 22 stores programs and various data. The RAM device 23 is used as a work area for the CPU 21. The CPU 21 executes programs stored in the storage section 17 or the ROM device 22. In a situation in which the optional memory 18 is mounted in the MFP 10, the CPU 21 can also use the optional memory 18 as a work area in addition to the RAM device 23.

Figure 2:
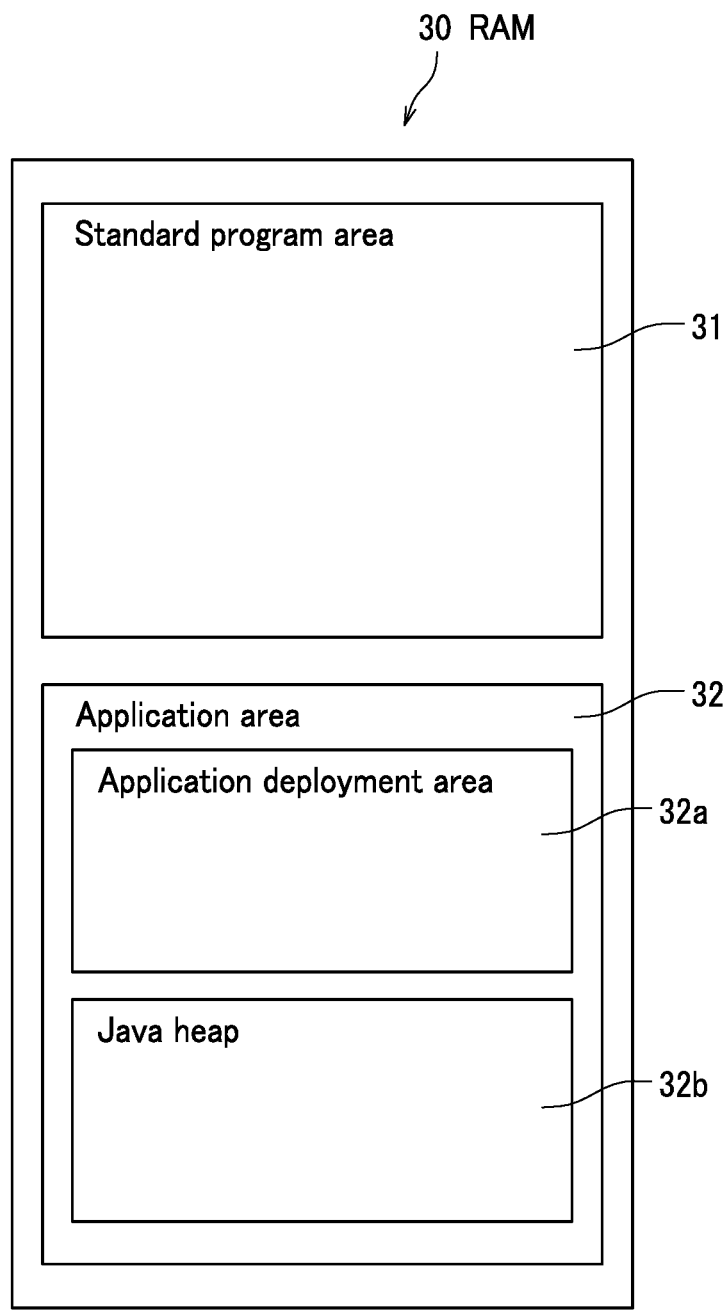
FIG. 2 is a diagram illustrating an example of areas of a RAM device included in the MFP illustrated in FIG. 1.

FIG. 2 is a diagram illustrating an example of areas of a RAM device 30 included in the MFP 10.

As illustrated in FIG. 2, the RAM device 30 includes a standard program area 31 for the standard programs 17a (see FIG. 1) and an application area 32 for the applications 17b (see FIG. 1). The application area 32 includes an application deployment area 32a as a deployment area in which the applications 17b are deployed and a Java heap 32b as a processing area that the applications 17b use for a process. In a situation in which the optional memory 18 is not mounted in the MFP 10, the RAM device 30 corresponds to the RAM device 23. In a situation in which the optional memory 18 is mounted in the MFP 10, the RAM device 30 corresponds to the RAM device 23 and the optional memory 18.

As illustrated in FIG. 1, the storage section 17 can store an upper limit 17d of the size of the application deployment area 32a (a first upper limit, which will be referred to below as an "application deployment area upper limit") of the RAM device 23 (see FIG. 2) and an upper limit 17e of the size of the Java heap 32b (a second upper limit, which will be referred to below as a "Java heap upper limit") of the RAM device 23 (see FIG. 2).

Figure 3:
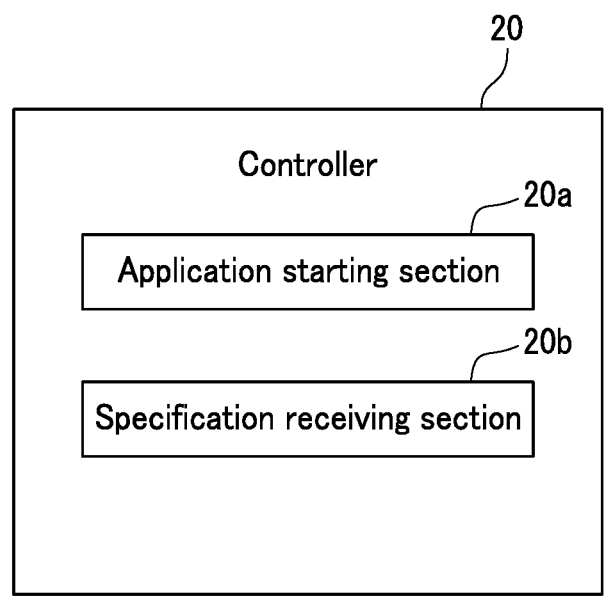
FIG. 3 is a block diagram illustrating functions executed by a controller illustrated in FIG. 1.

FIG. 3 is a block diagram of functions executed by the controller 20.

As illustrated in FIG. 3, the controller 20 functions as an application starting section 20a and a specification receiving section 20b through execution of the application start control program 17c (see FIG. 1) stored in the storage section 17 (see FIG. 1). The application starting section 20a controls starting of the applications 17b according to the application deployment area upper limit 17d (see FIG. 1) and the Java heap upper limit 17e (see FIG. 1). The specification receiving section 20b receives setting (specification) of the application deployment area upper limit 17d and the Java heap upper limit 17e.

Next, operation of the MFP 10 will be described.

First, description will be made about operation of the MFP 10 for displaying the application deployment area upper limit 17d and the Java heap upper limit 17e in a maintenance mode.

The maintenance mode is used by for example a serviceperson of the MFP 10 and executed in response to a specific operation on the operation section 11. The specification receiving section 20b performs operation illustrated in FIG. 4 when an instruction to display the application deployment area upper limit 17d and the Java heap upper limit 17e has been input through the operation section 11 in the maintenance mode.

Figure 4:
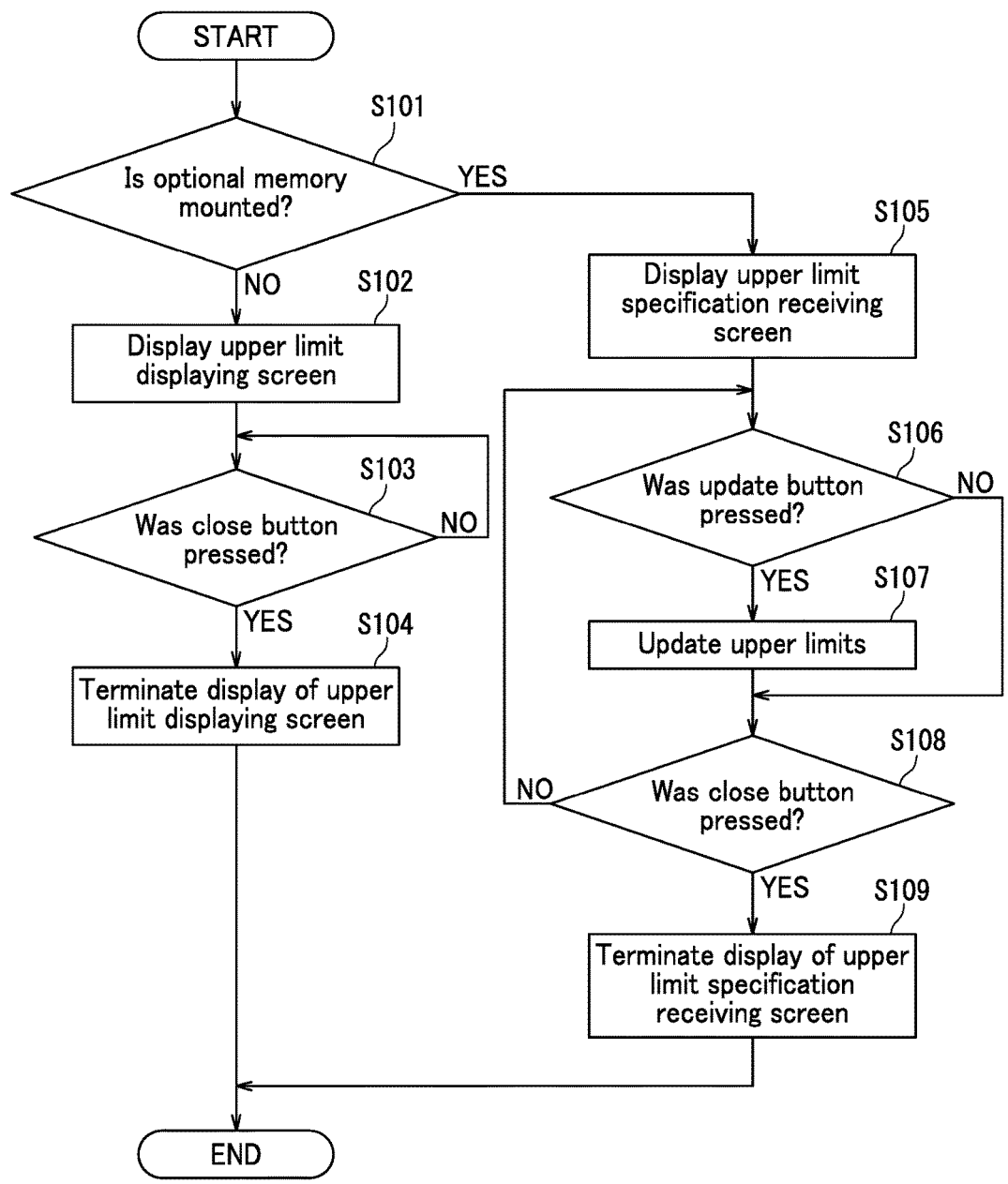
FIG. 4 is a flowchart of operation of the MFP illustrated in FIG. 1 for displaying an application deployment area upper limit and a Java heap upper limit in a maintenance mode.

FIG. 4 is a flowchart of the operation of the MFP 10 for displaying the application deployment area upper limit 17d and the Java heap upper limit 17e in the maintenance mode.

As illustrated in FIG. 4, the specification receiving section 20b determines whether or not the optional memory 18 is mounted in the MFP 10 (S101).

Upon determining in S101 that the optional memory 18 is not mounted in the MFP 10, the specification receiving section 20b causes the display section 12 to display an upper limit displaying screen 50 (see FIG. 5) that indicates the application deployment area upper limit 17d and the Java heap upper limit 17e (S102).

Figure 5:
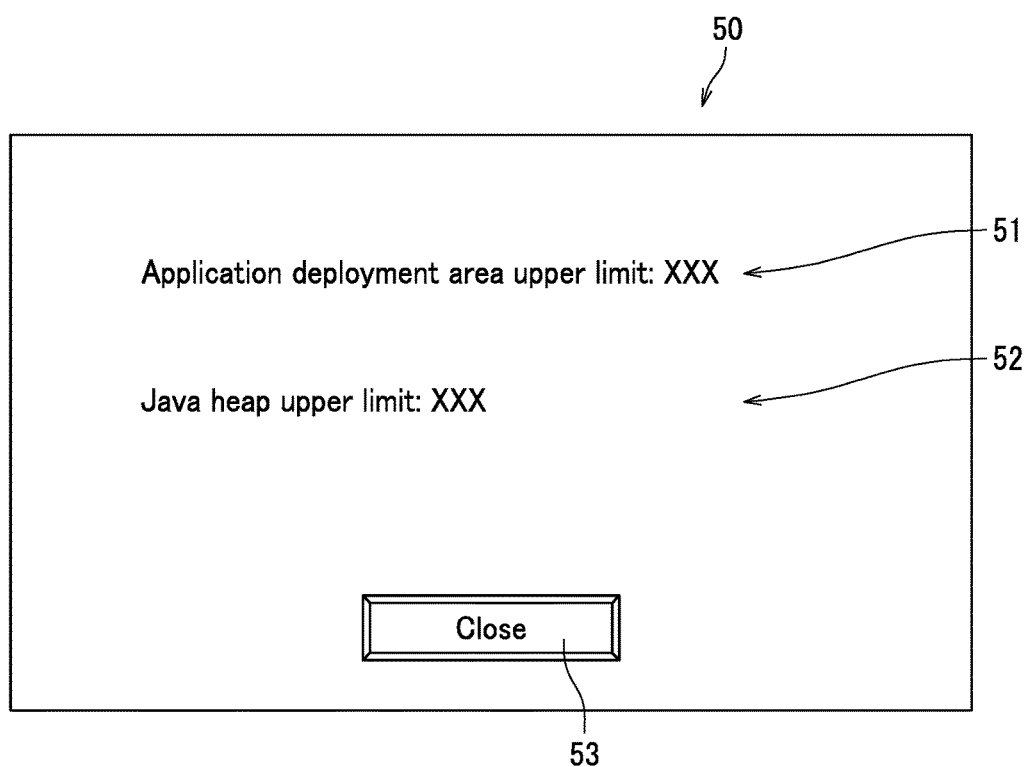
FIG. 5 is a diagram illustrating an example of an upper limit displaying screen displayed by the operation illustrated in FIG. 4.

The upper limit displaying screen 50 illustrated in FIG. 5 includes a text 51 indicating the application deployment area upper limit 17d, a text 52 indicating the Java heap upper limit 17e, and a close button 53 for closing the upper limit displaying screen 50. Although the text 51 is represented by "XXX" in FIG. 5, in practice, the application deployment area upper limit 17d is indicated by a numerical value. Similarly, although the text 52 is represented by "XXX" in FIG. 5, in practice, the Java heap upper limit 17e is indicated by a numerical value. The upper limit displaying screen 50 does not receive setting (specification) of the application deployment area upper limit 17d and the Java heap upper limit 17e. That is, the specification receiving section 20b does not receive setting of the application deployment area upper limit 17d and the Java heap upper limit 17e in a situation in which the optional memory 18 is not mounted in the MFP 10.

As illustrated in FIG. 4, the specification receiving section 20b determines whether or not the close button 53 was pressed after the process in S102 until finally determining that the close button 53 was pressed (S103).

Upon determining in S103 that the close button 53 was pressed (YES in S103), the specification receiving section 20b causes the display section 12 to terminate display of the upper limit displaying screen 50 (S104) and terminates the operation illustrated in FIG. 4.

Upon determining in S101 that the optional memory 18 is mounted in the MFP 10 (YES in S101), the specification receiving section 20*b* causes the display section 12 to display an upper limit specification receiving screen 60 (see FIG. 6) for receiving setting (specification) of the application deployment area upper limit 17*d* and the Java heap upper limit 17*e* (S105). That is, the specification receiving section 20*b* receives setting (specification) of the application deployment area upper limit 17*d* and the Java heap upper limit 17*e* in a situation in which the optional memory 18 is mounted in the MFP 10.

Figure 6:
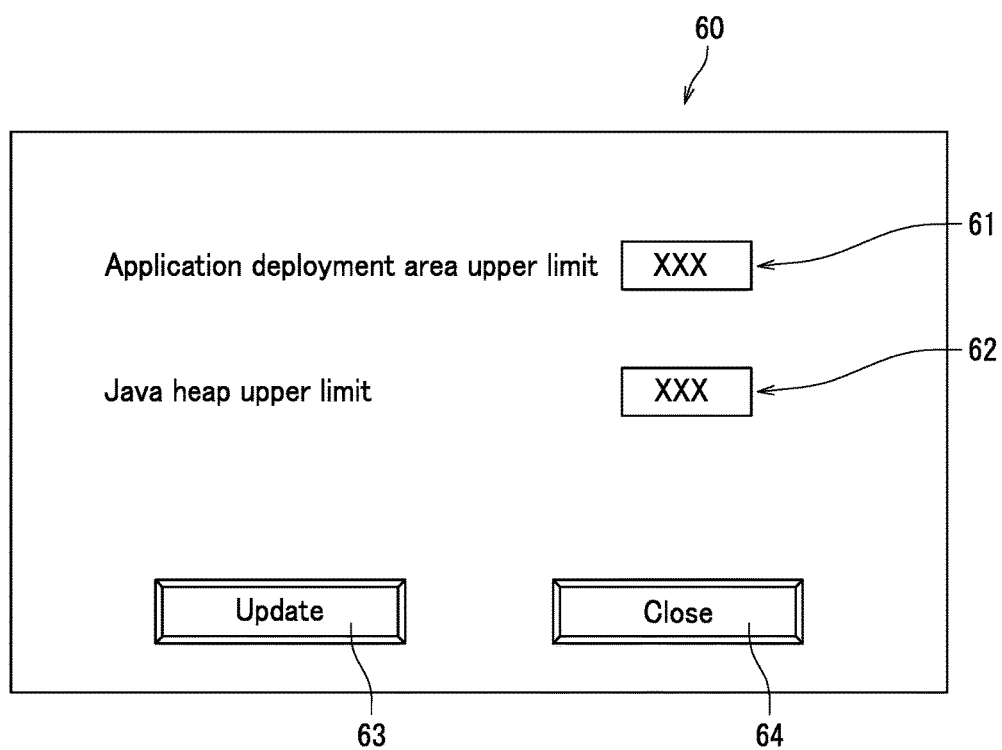
FIG. 6 is a diagram illustrating an example of an upper limit specification receiving screen displayed by the operation illustrated in FIG. 4.

The upper limit specification receiving screen 60 illustrated in FIG. 6 includes a text box 61 in which the application deployment area upper limit is displayed, a text box 62 in which the Java heap upper limit is displayed, an update button 63, and a close button 64. The update button 63 is a button for updating the application deployment area upper limit 17*d* with a value displayed in the text box 61 and updating the Java heap upper limit 17*e* with a value displayed in the text box 62. The close button 64 is a button for closing the upper limit specification receiving screen 60. The value displayed in the text box 61 is the application deployment area upper limit 17*d* when display of the upper limit specification receiving screen 60 is initiated. However, the value displayed in the text box 61 can be changed through the operation section 11. Similarly, the value displayed in the text box 62 is the Java heap upper limit 17*e* when display of the upper limit specification receiving screen 60 is initiated. However, the value displayed in the text box 62 can be changed through the operation section 11. Although "XXX" is illustrated in the text box 61 in FIG. 6, in practice, a numerical value indicating the application deployment area upper limit is displayed in the text box 61. Similarly, although "XXX" is illustrated in the text box 62 in FIG. 6, in practice, a numerical value indicating the Java heap upper limit is displayed in the text box 62.

As illustrated in FIG. 4, the specification receiving section 20*b* determines whether or not the update button 63 was pressed after the process in S105 (S106).

Upon determining in S106 that the update button 63 was pressed (YES in S106), the specification receiving section 20*b* updates the application deployment area upper limit 17*d* with a value displayed in the text box 61 at that moment and updates the Java heap upper limit 17*e* with a value displayed in the text box 62 at that moment (S107).

Upon determining in S106 that the update button 63 was not pressed (NO in S106) or executing the process in S107, the specification receiving section 20*b* determines whether or not the close button 64 was pressed (S108).

Upon determining in S108 that the close button 64 was not pressed (NO in S108), the specification receiving section 20*b* executes the process in S106.

Upon determining in S108 that the close button 64 was pressed (YES in S108), the specification receiving section 20*b* causes the display section 12 to terminate display of the upper limit specification receiving screen 60 (S109) and terminates the operation illustrated in FIG. 4.

Next, description will be made about operation of the MFP 10 for setting parameters for starting the applications 17*b*.

Figure 7:
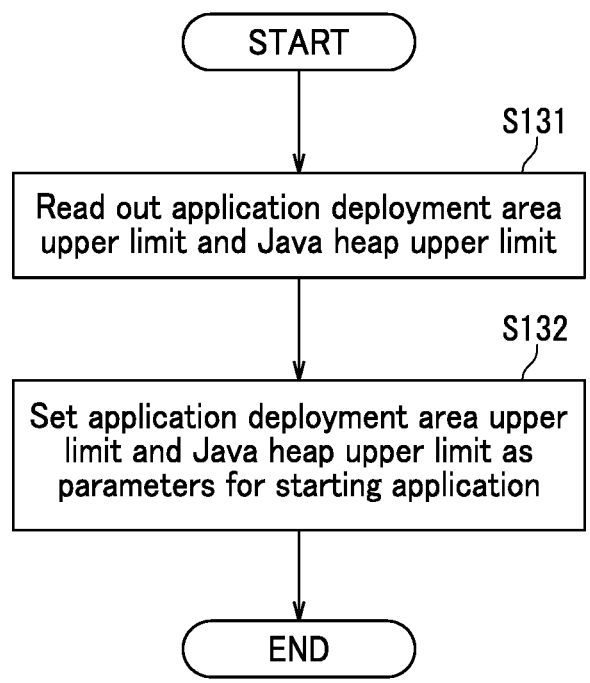
FIG. 7 is a flowchart of operation of the MFP illustrated in FIG. 1 for setting parameters for starting applications.

FIG. 7 is a flowchart of the operation of the MFP 10 for setting parameters for starting the applications 17*b*. The controller 20 performs the operation illustrated in FIG. 7 only just after the MFP 10 is turned on.

As illustrated in FIG. 7, the application starting section 20*a* reads out the application deployment area upper limit 17*d* and the Java heap upper limit 17*e* (S131). Then, the application starting section 20*a* sets the application deployment area upper limit 17*d* and the Java heap upper limit 17*e*, which were read out in S131, as the parameters for starting the applications 17*b* (S132).

Next, description will be made about operation of the MFP 10 for starting each of the applications 17*b*.

Figure 8:
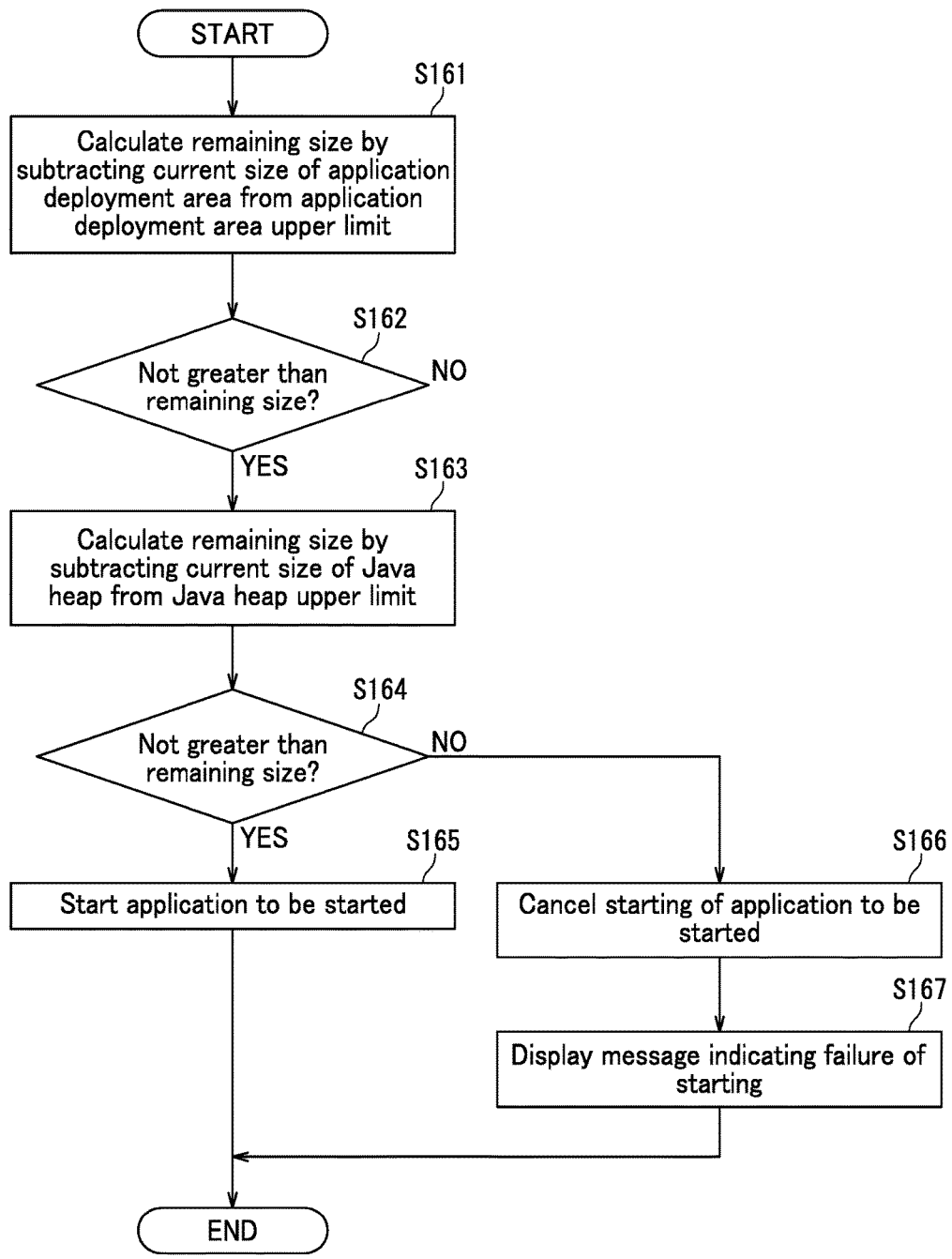
FIG. 8 is a flowchart of operation of the MFP illustrated in FIG. 1 for starting an application.

FIG. 8 is a flowchart of the operation of the MFP 10 for starting each of the applications 17*b*.

The controller 20 performs the operation illustrated in FIG. 8 for starting each of the applications 17*b*.

As illustrated in FIG. 8, the application starting section 20*a* calculates a remaining size (a first remaining size) by subtracting a current size of the application deployment area 32*a* from the application deployment area upper limit that was set in S132 in FIG. 7 (S161). Then, the application starting section 20*a* determines whether or not a size of an area of the RAM device 30 in which the application 17*b* to be started will be deployed is not greater than the size calculated in S161 (S162).

Upon determining in S162 that the size of the area in which the application 17*b* to be started will be deployed is not greater than the size calculated in S161 (YES in S162), the application starting section 20*a* calculates a remaining size (a second remaining size) by subtracting a current size of the Java heap 32*b* from the Java heap upper limit 17*e* that was set in S132 in FIG. 7 (S163). Then, the application starting section 20*a* determines whether or not a size of an area of the RAM device 30 that the application 17*b* to be started will use for a process is not greater than the size calculated in S163 (S164).

Upon determining in S164 that the size of the area that the application 17*b* to be started will use for the process is not greater than the size calculated in S163 (YES in S164), the application starting section 20*a* starts the application 17*b* to be started (S165) and terminates the operation illustrated in FIG. 8.

Upon determining in S162 that the size of the area in which the application 17*b* to be started will be deployed is greater than the size calculated in S161 (NO in S162) or determining in S164 that the size of the area that the application 17*b* to be started will use for the process is greater than the size calculated in S163 (NO in S164), the application starting section 20*a* cancels starting of the application 17*b* to be started (S166). Then, the application starting section 20*a* causes the display section 12 to display a message 70 (see FIG. 9) indicating that the application 17*b* to be started could not be started (S167) and terminates the operation illustrated in FIG. 8.

As illustrated in FIG. 9, the message 70 that the display section 12 displays in S167 preferably includes suggestion to end a running application 17*b*. Note that the process in S167 may be omitted.

As described above, the MFP 10 receives specification of the application deployment area upper limit 17*d* and the Java heap upper limit 17*e* (S107) and controls starting of each of the applications 17*b* according to the application deployment area upper limit 17*d* as well as the Java heap upper limit 17*e* (S161 to S165). Therefore, the MFP 10 can prevent or reduce failure of normal execution of the standard programs 17*a* due to starting of the application 17*b*. That is, the MFP 10 can normally execute the application 17*b* without restricting various standard functions such as printing and copying implemented by the standard programs 17*a* (hereinafter referred to as "standard functions") by for example degrading performance of any of the standard functions or making any of the standard functions unusable.

In a situation in which the optional memory 18 is not included in the MFP 10 (NO in S101), the MFP 10 forbids changing of the number of simultaneously executable applications 17*b* (S107). Therefore, the number of simultaneously executable applications 17*b* is not increased in a situation in which the optional memory 18 is not included and the capacity of the installed RAM device 30 is small. Thus, the MFP 10 can prevent or reduce failure of normal execution of the standard programs 17*a* due to starting of the application 17*b*. Note that the MFP 10 may permit changing of the number of simultaneously executable applications 17*b* regardless of whether or not the optional memory 18 is mounted in the MFP 10.

Second Embodiment

The following describes a configuration of a MFP as an image forming apparatus according to a second embodiment of the present disclosure.

Elements of configuration of the MFP according to the present embodiment which are the same as those of the MFP 10 according to the first embodiment (see FIG. 1) are indicated by the same reference signs as those of the MFP 10, and detailed explanations of which are omitted.

Figure 10:
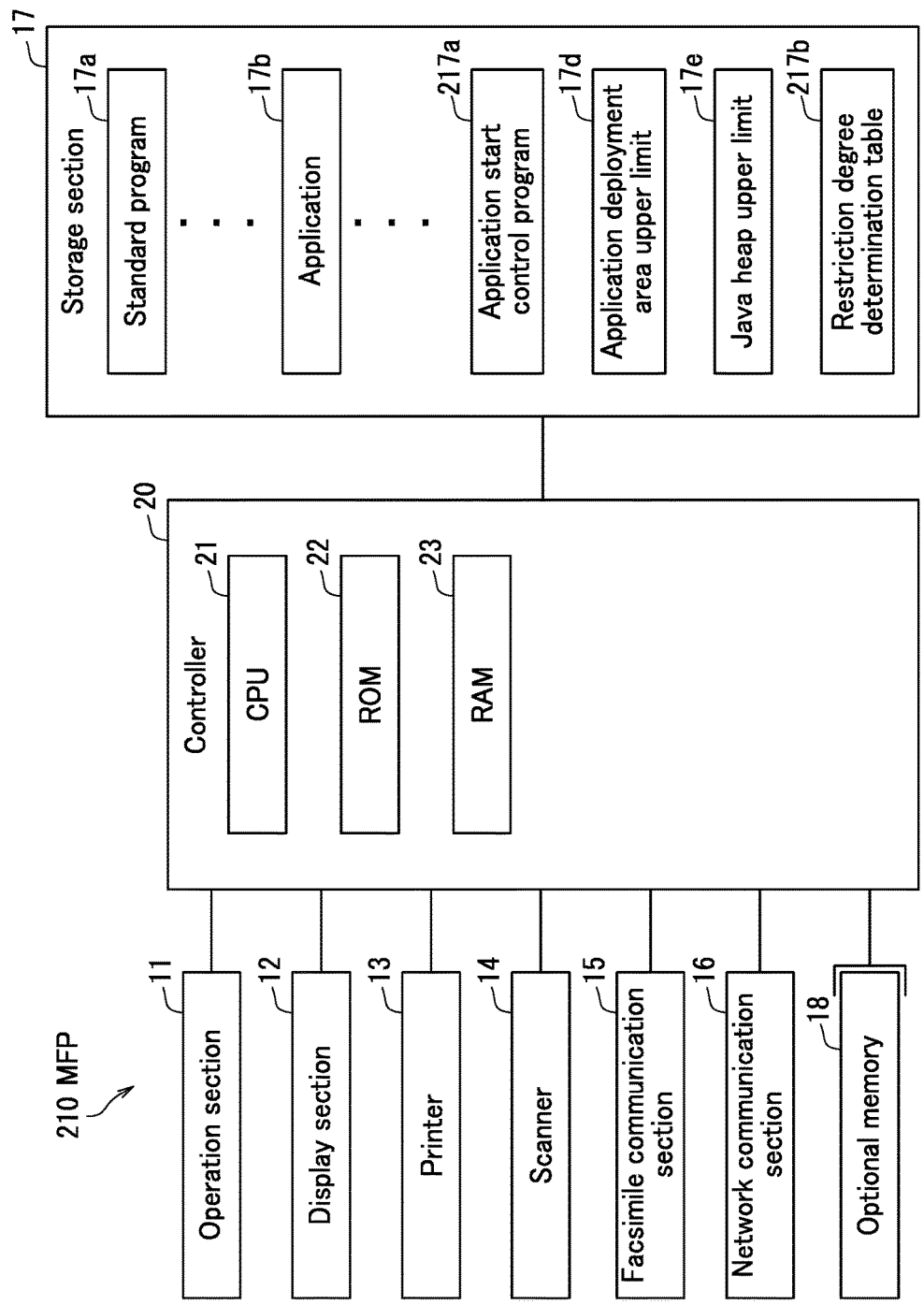
FIG. 10 is a block diagram of a MFP according to a second embodiment of the present disclosure.

FIG. 10 is a block diagram of a MFP 210 according to the present embodiment.

As illustrated in FIG. 10, the MFP 210 has the same configuration as the MFP 10 (see FIG. 1) except that the storage section 17 includes an application start control program 217*a* in place of the application start control program 17*c* (see FIG. 1) and includes a restriction degree determination table 217*b*. The application start control program 217*a* is a program for controlling starting of the applications 17*b*. The restriction degree determination table 217*b* is a table for determining a degree of restriction of the standard functions.

Figure 11:
FIG. 11 is a diagram illustrating an example of a restriction degree determination table illustrated in FIG. 10.

FIG. 11 is a diagram illustrating an example of the restriction degree determination table 217*b*.

As illustrated in FIG. 11, the restriction degree determination table 217*b* shows correspondence between details of restriction of the standard functions and reference ranges of a value (specific value) obtained by subtracting the upper limits, that is, a sum of the application deployment area upper limit 17*d* and the Java heap upper limit 17*e*, from the capacity of the RAM device 30. According to the restriction degree determination table 217*b* illustrated in FIG. 11, in a situation in which the value obtained by subtracting the upper limits from the capacity of the RAM device 30 is not less than "xxx" and less than "yyy", image data of only five sheets of original document can be simultaneously expanded in the RAM device 30 by raster image processor (RIP) process. By contrast, according to the restriction degree determination table 217*b* illustrated in FIG. 11, in a situation in which the value obtained by subtracting the upper limits from the capacity of the RAM device 30 is not less than "yyy", image data of ten sheets of original document can be simultaneously expanded in the RAM device 30 by the RIP process. As image data of a larger number of sheets of original document can be simultaneously expanded in the RAM device 30 by the RIP process, the RIP process can be executed at a higher speed. That is, the larger the value obtained by subtracting the upper limits from the capacity of the RAM device 30, the lower the degree of restriction of the standard functions (the standard functions may not be restricted depending on a situation). Also, the smaller the value obtained by subtracting the upper limits from the capacity of the RAM device 30, the higher the degree of restriction of the standard functions.

In FIG. 11, restriction of the standard functions is described about the RIP process. However, details of restriction of the standard functions need not relate to the RIP process as long as relating to restriction of the standard functions. For example, details of restriction of the standard functions may indicate that a specific standard function becomes unusable in a situation in which the value obtained by subtracting the upper limits from the capacity of the RAM device 30 is not greater than a specific value.

Figure 12:
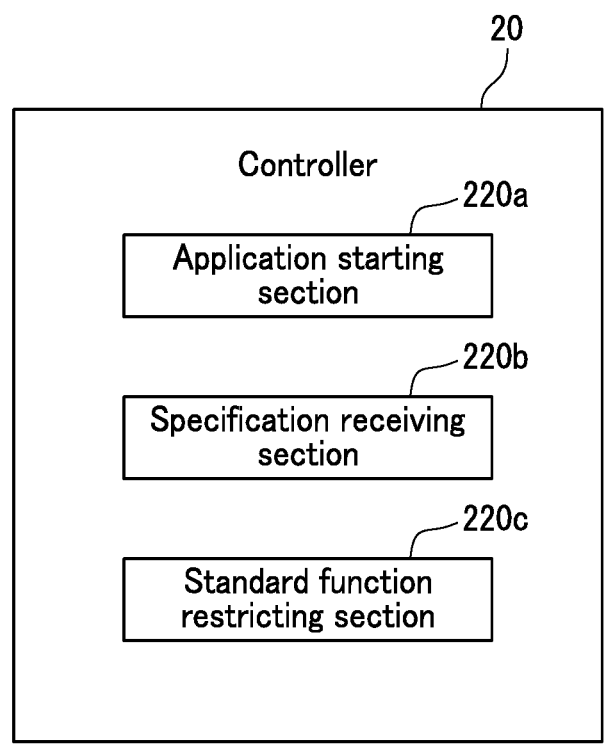
FIG. 12 is a block diagram of functions executed by a controller illustrated in FIG. 10.

FIG. 12 is a block diagram of functions executed by the controller 20.

As illustrated in FIG. 12, the controller 20 functions as an application starting section 220*a*, a specification receiving section 220*b*, and a standard function restricting section 220*c* through execution of the application start control program 217*a* (see FIG. 10) stored in the storage section 17 (see FIG. 10). The application starting section 220*a* controls starting of the applications 17*b* according to the application deployment area upper limit 17*d* (see FIG. 10) and the Java heap upper limit 17*e* (see FIG. 10). The specification receiving section 220*b* receives specification of the application deployment area upper limit 17*d* and the Java heap upper limit 17*e*. The standard function restricting section 220*c* restricts the standard functions implemented by the standard programs 17*a*.

Next, operation of the MFP 210 will be described.

First, description will be made about operation of the MFP 210 for displaying the application deployment area upper limit 17*d* and the Java heap upper limit 17*e* in the maintenance mode.

Figure 13A:
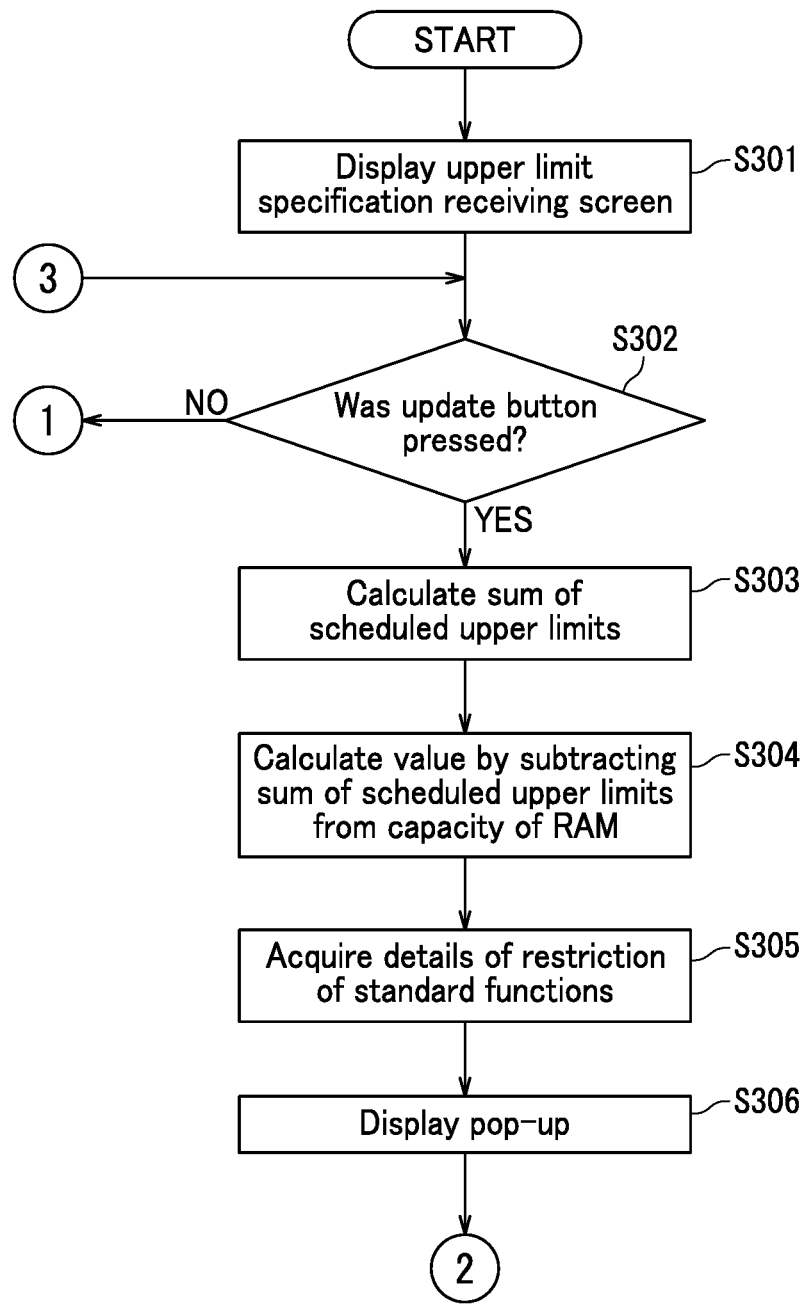
FIG. 13A is a flowchart illustrating a first half of operation of the MFP illustrated in FIG. 10 for displaying an application deployment area upper limit and a Java heap upper limit in a maintenance mode.
Figure 13B:
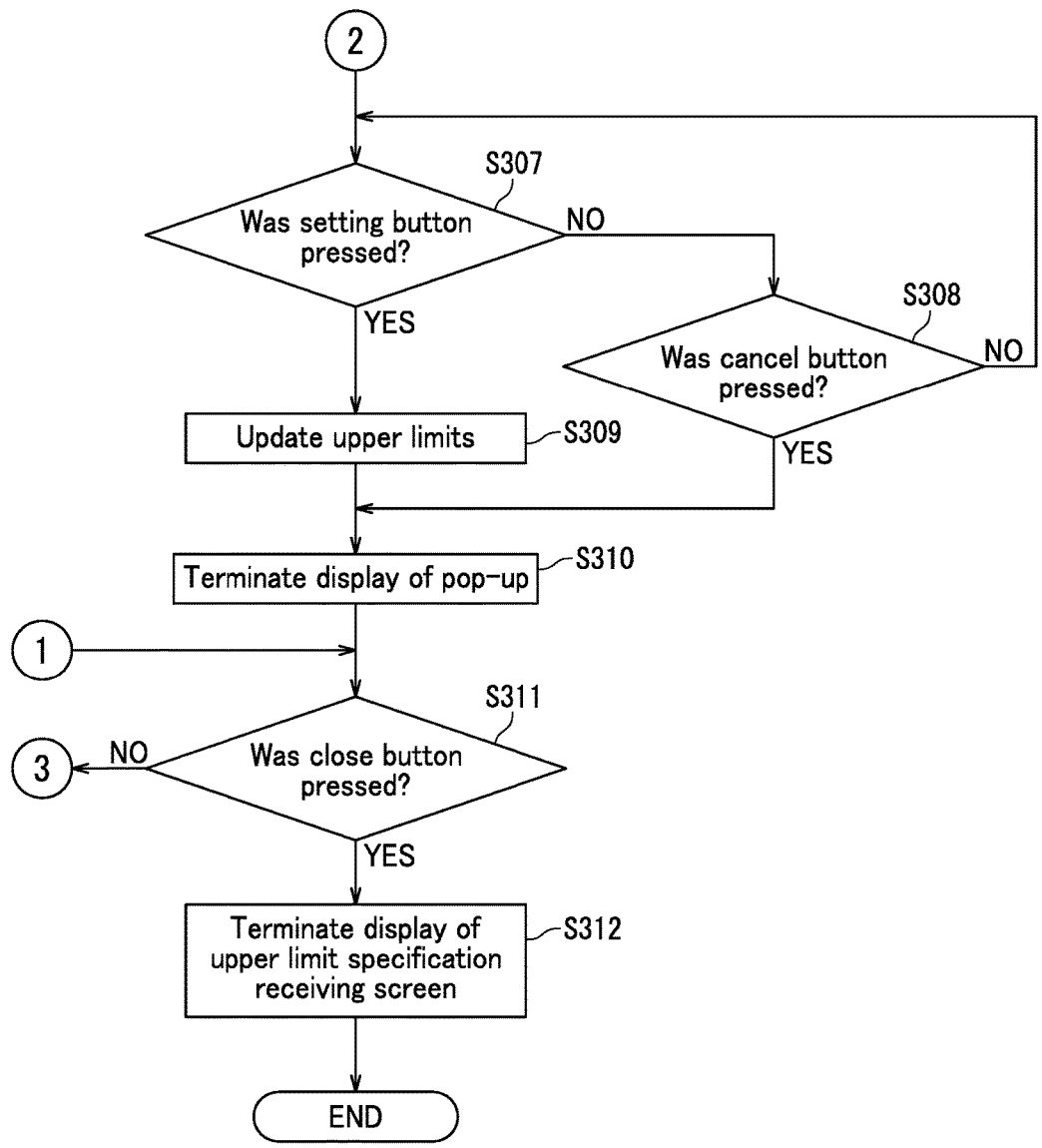
FIG. 13B is a flowchart illustrating a second half of the operation of the MFP illustrated in FIG. 10 for displaying the application deployment area upper limit and the Java heap upper limit in the maintenance mode.

The specification receiving section 220*b* performs operation illustrated in FIGS. 13A and 13B when an instruction to display the application deployment area upper limit 17*d* and the Java heap upper limit 17*e* has been input through the operation section 11 in the maintenance mode.

FIG. 13A is a flowchart illustrating a first half of the operation of the MFP 210 for displaying the application deployment area upper limit 17*d* and the Java heap upper limit 17*e* in the maintenance mode. FIG. 13B is a flowchart illustrating a second half of the operation of the MFP 210 for displaying the application deployment area upper limit 17*d* and the Java heap upper limit 17*e* in the maintenance mode.

As illustrated in FIG. 13A, the specification receiving section 220*b* causes the display section 12 to display the upper limit specification receiving screen 60 illustrated in FIG. 6 (S301).

Then, the specification receiving section 220*b* determines whether or not the update button 63 was pressed after the process in S301 (S302).

Upon determining in S302 that the update button 63 was pressed (YES in S302), the specification receiving section 220*b* calculates a sum of: a value displayed in the text box 61 at that moment, that is, a scheduled value of the application deployment area upper limit; and a value displayed in the text box 62 at that moment, that is, a scheduled value of the Java heap upper limit (S303). Then, the specification receiving section 220*b* calculates a value obtained by subtracting the sum calculated in S303 from a current available capacity of the RAM device 30 (S304).

Then, the specification receiving section 220*b* acquires "details of restriction of the standard functions" corresponding to the value calculated in S304 according to the restriction degree determination table 217*b* assuming that the value calculated in S304 is a "value obtained by subtracting the upper limits from the capacity of the RAM device 30" (S305).

Then, the specification receiving section 220*b* causes a pop-up 250 (see FIG. 14) for indicating the "details of restriction of the standard functions" acquired in S305 to be displayed on the upper limit specification receiving screen 60 (S306).

Figure 14:
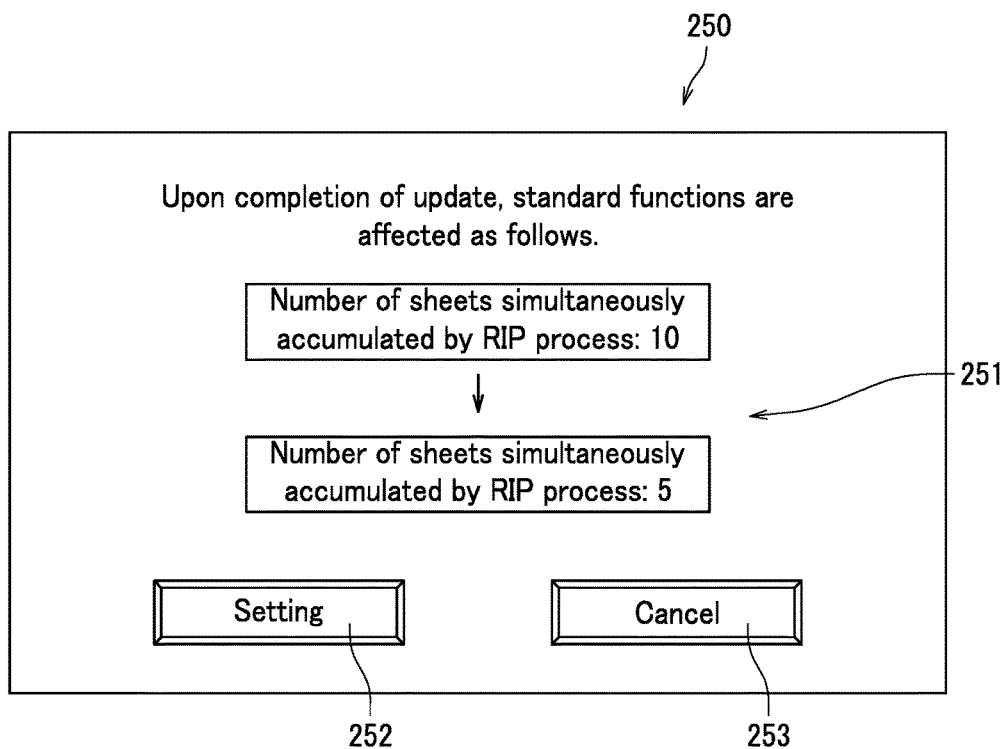
FIG. 14 is a diagram illustrating an example of a pop-up displayed by the operation illustrated in FIGS. 13A and 13B.

The pop-up illustrated in FIG. 14 includes a text 251 indicating the "details of restriction of the standard functions" acquired in S305, a setting button 252 for completing updating of the upper limits, and a cancel button 253 for canceling updating of the upper limits.

As illustrated in FIGS. 13A and 13B, the specification receiving section 220*b* determines whether or not the setting button 252 was pressed after the process in S306 (S307).

Upon determining in S307 that the setting button 252 was not pressed (NO in S307), the specification receiving section 220*b* determines whether or not the cancel button 253 was pressed (S308).

Upon determining in S308 that the cancel button 253 was not pressed (NO in S308), the specification receiving section 220*b* executes the process in S307.

Upon determining in S307 that the setting button 252 was pressed (YES in S307), the specification receiving section 220*b* updates the application deployment area upper limit 17*d* with a value displayed in the text box 61 at that moment and updates the Java heap upper limit 17*e* with a value displayed in the text box 62 at that moment (S309).

Upon determining in S308 that the cancel button 253 was pressed or completing the process in S309, the specification receiving section 220*b* terminates display of the pop-up 250 (S310).

Upon determining in S302 that the update button 63 was not pressed (NO in S302) or executing the process in S310, the specification receiving section 220*b* determines whether or not the close button 64 was pressed (S311).

Upon determining in S311 that the close button 64 was not pressed (NO in S311), the specification receiving section 220*b* executes the process in S302.

Upon determining in S311 that the close button 64 was pressed (YES in S311), the specification receiving section 220*b* causes the display section 12 to terminate display of the upper limit specification receiving screen 60 (S312) and terminates the operation illustrated in FIGS. 13A and 13B.

Next, description will be made about operation of the MFP 210 for setting parameters for starting the applications 17*b*.

Figure 15:
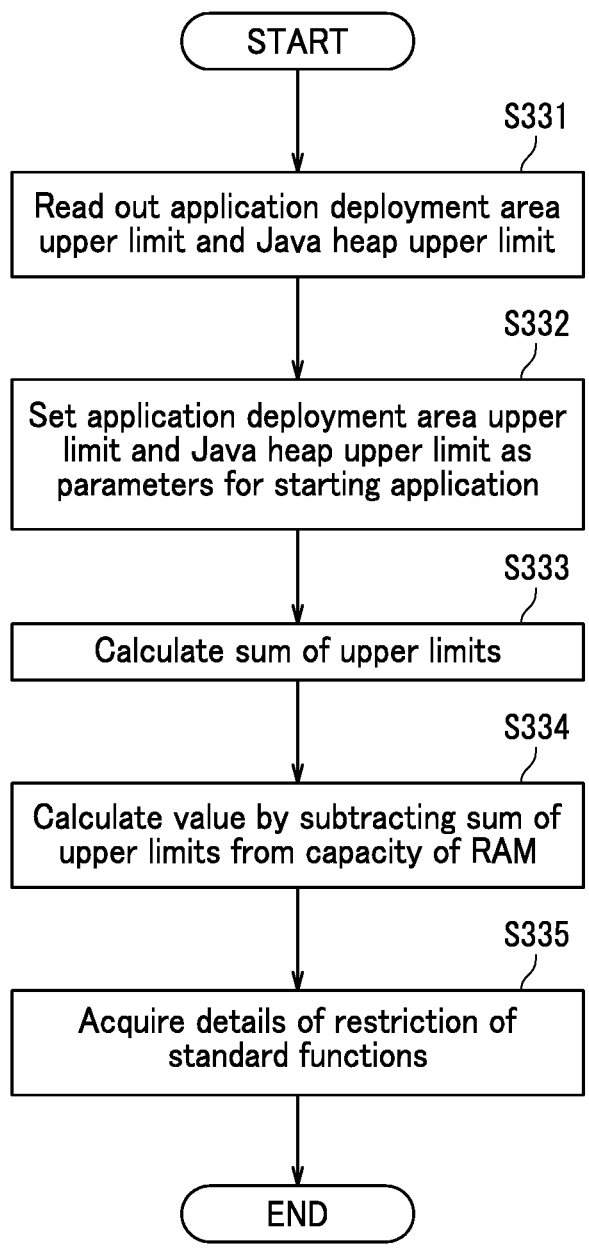
FIG. 15 is a flowchart of operation of the MFP illustrated in FIG. 10 for setting parameters for starting applications.

FIG. 15 is a flowchart of the operation of the MFP 210 for setting parameters for starting the applications 17*b*. The controller 20 performs the operation illustrated in FIG. 15 only just after the MFP 210 is turned on.

As illustrated in FIG. 15, the application starting section 220*a* reads out the application deployment area upper limit 17*d* and the Java heap upper limit 17*e* (S331). Then, the application starting section 220*a* sets the application deployment area upper limit 17*d* and the Java heap upper limit 17*e*, which were read out in S331, as the parameters for starting the applications 17*b* (S332).

Then, the standard function restricting section 220*c* calculates a sum of the application deployment area upper limit 17*d* and the Java heap upper limit 17*e*, which were read out in S331 (S333). Then, the standard function restricting section 220*c* calculates a value obtained by subtracting the sum calculated in S333 from a current available capacity of the RAM device 30 (S334).

Then, the standard function restricting section 220*c* acquires "details of restriction of the standard functions" corresponding to the value calculated in S334 according to the restriction degree determination table 217*b* (S335) and terminates the operation illustrated in FIG. 15. In a situation in which a standard function is executed after the process in S335 and before a process in S364 of operation illustrated in FIG. 16 described below, the standard function restricting section 220*c* restricts the standard function according to the "details of restriction of the standard functions" acquired in S335.

Next, description will be made about operation of the MFP 210 for starting each of the applications 17*b*.

Similarly to the first embodiment, the controller 20 performs the operation illustrated in FIG. 8 for starting each of the applications 17*b*.

Next, description will be made about operation of the MFP 210 in a situation in which a mounting state of the optional memory 18 has been changed.

Figure 16:
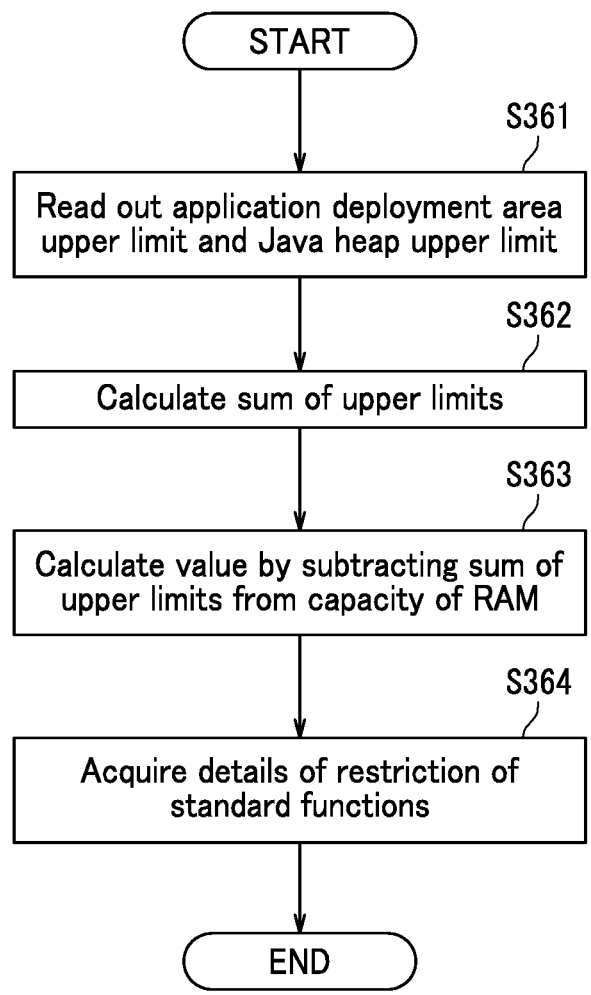
FIG. 16 is a flowchart of operation of the MFP illustrated in FIG. 10 in a situation in which a mounting state of an optional memory has been changed.

FIG. 16 is a flowchart of the operation of the MFP 210 in a situation in which a mounting state of the optional memory 18 has been changed.

The controller 20 performs the operation illustrated in FIG. 16 in a situation in which a mounting state of the optional memory 18 has been changed, for example by attaching or removing the optional memory 18 after termination of the operation illustrated in FIG. 15.

As illustrated in FIG. 16, the standard function restricting section 220*c* reads out the application deployment area upper limit 17*d* and the Java heap upper limit 17*e* (S361). Then, the standard function restricting section 220*c* calculates a sum of the application deployment area upper limit 17*d* and the Java heap upper limit 17*e*, which were read out in S361 (S362). Then, the standard function restricting section 220*c* calculates a value obtained by subtracting the sum calculated in S362 from a current available capacity of the RAM device 30 (S363).

Then, the standard function restricting section 220*c* acquires "details of restriction of the standard functions" corresponding to the value calculated in S363 according to the restriction degree determination table 217*b* (S364) and terminates the operation illustrated in FIG. 16. In a situation in which a standard function is executed after the process in S364, the standard function restricting section 220*c* restricts the standard function according to the "details of restriction of the standard functions" acquired in S364. That is, the standard function restricting section 220*c* changes the degree of restriction of the standard functions according to the sum of the application deployment area upper limit 17*d* and the Java heap upper limit 17*e*.

As described above, the MFP 210 receives specification of the application deployment area upper limit 17*d* and the Java heap upper limit 17*e* (S309), and controls starting of each of the applications 17*b* according to the application deployment area upper limit as well as the Java heap upper limit (S161 to S165). Therefore, the MFP 210 can prevent or reduce failure of normal execution of the standard programs 17*a* due to starting of the application 17*b*. That is, the MFP 210 may restrict any of the standard functions by for example degrading performance of the standard function or making the standard function unusable. However, the MFP 210 can normally execute the standard functions within a scope of restriction thereof while normally executing the application 17*b*.

The MFP 210 changes the degree of restriction of the standard functions according to the application deployment area upper limit 17*d* and the Java heap upper limit 17*e*. In a situation in which the number of simultaneously executable applications 17b is increased, the MFP 210 appropriately restricts the standard functions. Thus, the MFP 210 can prevent or reduce failure of normal execution of the standard programs 17a due to starting of the application 17b while executing the standard functions within a scope of restriction thereof.

In a situation in which the optional memory 18 is included in the MFP 210, the MFP 210 sets the degree of restriction of the standard functions lower than in a situation in which the optional memory 18 is not included. Through the above, the MFP 210 can appropriately prevent or reduce failure of normal execution of the standard programs 17a due to starting of the application 17b while keeping the degree of restriction of the standard functions low.

Note that in the MFP 210, the standard function restricting section 220c automatically changes the degree of restriction of the standard functions. However, the MFP 210 may be configured to change the degree of restriction of the standard functions in response to an instruction input through the operation section 11. For example, a serviceperson can determine a standard function that is not used by users of the MFP 210 based on use history information stored in the MFP 210 and manually restrict the standard function.

In the MFP of each of the above-described embodiments, the application deployment area upper limit and the Java heap upper limit are each specified by a numerical value indicating a specific size. However, the MFP may be configured such that the application deployment area upper limit and the Java heap upper limit are each specified by selecting one of a plurality of levels associated with numerical values indicating specific sizes. For example, the MFP may be configured such that the application deployment area upper limit and the Java heap upper limit are each specified by selecting one of: a standard level for specifying a default upper limit; an application priority level for specifying an upper limit for giving priority to execution of the applications 17b, that is, an upper limit larger than the default upper limit; and a standard function priority level for specifying an upper limit for giving priority to execution of the standard functions, that is, an upper limit smaller than the default upper limit.

Although the image forming apparatus of the present disclosure is the MFP in each of the above-described embodiments, the image forming apparatus may be an image forming apparatus other than the MFP such as a dedicated printer, a dedicated copier, a dedicated facsimile device, and a dedicated scanner.

What is claimed is:

1. An image forming apparatus, comprising:
a central processing unit (CPU);
a random access memory (RAM) device; and
a storage device storing a standard program, a Java (registered trademark) application, and an application start control program that controls starting of the Java application,
wherein:
the CPU executes the application start control program to function as an application starting section and a specification receiving section;
the application starting section controls starting of the Java application according to a first upper limit of a size of a deployment area of the RAM device in which the Java application is deployed and a second upper limit of a size of a processing area of the RAM device that the Java application uses for a process; and
the specification receiving section receives setting of the first upper limit of the size of the deployment area and the second upper limit of the size of the processing area.

2. The image forming apparatus according to claim 1, further comprising a display device, wherein
the specification receiving section causes the display device to display an upper limit specification receiving screen when receiving the setting of the first upper limit and the second upper limit.

3. The image forming apparatus according to claim 2, wherein:
the storage device further stores a restriction degree determination table for determining a degree of restriction of a standard function implemented by the standard program;
the restriction degree determination table shows correspondence between details of restriction of the standard function and a reference range of a specific value obtained by subtracting a sum of the first upper limit and the second upper limit from a current available capacity of the RAM device; and
the specification receiving section:
calculates the specific value when an instruction to update the first upper limit and the second upper limit has been input through the upper limit specification receiving screen;
acquires details of restriction of the standard function corresponding to the calculated specific value according to the restriction degree determination table; and
causes a pop-up for indicating the acquired details of restriction of the standard function to be displayed on the upper limit specification receiving screen.

4. The image forming apparatus according to claim 3, wherein the standard function restricting section:
calculates the specific value when an instruction to set the first upper limit and the second upper limit has been input through the pop-up;
acquires the details of restriction of the standard function corresponding to the calculated specific value according to the restriction degree determination table; and
restricts the standard function according to the acquired details of restriction of the standard function when the standard function is executed.

5. The image forming apparatus according to claim 1, configured to further include an optional RAM device,
wherein the specification receiving section:
does not receive the setting of the first upper limit and the second upper limit when the optional RAM device is not included in the image forming apparatus; and
receives the setting of the first upper limit and the second upper limit when the optional RAM device is included in the image forming apparatus.

6. The image forming apparatus according to claim 5, further comprising a display device,
wherein the specification receiving section:
causes the display device to display an upper limit specification receiving screen when receiving the setting of the first upper limit and the second upper limit; and
causes the display device to display an upper limit displaying screen for indicating the first upper limit and the second upper limit when not receiving the setting of the first upper limit and the second upper limit.

7. The image forming apparatus according to claim 1, wherein the application starting section:
   calculates a first remaining size by subtracting a current size of the deployment area from the first upper limit, and determines whether or not a size of an area of the RAM device in which the Java application to be started will be deployed is not greater than the first remaining size;
   when determining that the size of the area in which the Java application to be started will be deployed is not greater than the first remaining size, calculates a second remaining size by subtracting a current size of the processing area from the second upper limit, and determines whether or not a size of an area of the RAM device that the Java application to be started will use for the process is not greater than the second remaining size; and
   when determining that the size of the area that the Java application to be started will use for the process is not greater than the second remaining size, starts the Java application to be started.

8. The image forming apparatus according to claim 7, wherein
   the application starting section cancels starting of the Java application to be started upon determining that the size of the area in which the Java application to be started will be deployed is greater than the first remaining size, or determining that the size of the area that the Java application to be started will use for the process is greater than the second remaining size.

9. The image forming apparatus according to claim 8, further comprising a display device, wherein
   the application starting section causes the display device to display a message indicating that the Java application to be started has not been started when canceling starting of the Java application to be started.

10. The image forming apparatus according to claim 1, wherein:
   the CPU executes the application start control program to further function as a standard function restricting section that restricts a standard function implemented by the standard program; and
   the standard function restricting section changes a degree of restriction of the standard function according to a sum of the first upper limit and the second upper limit.

11. The image forming apparatus according to claim 10, configured to further include an optional RAM device, wherein
   when the optional RAM device is included in the image forming apparatus, the standard function restricting section sets the degree of restriction of the standard function lower than when the optional RAM device is not included in the image forming apparatus.

* * * * *